United States Patent
Mukawa et al.

(10) Patent No.: US 6,561,654 B2
(45) Date of Patent: May 13, 2003

(54) IMAGE DISPLAY DEVICE

(75) Inventors: Hiroshi Mukawa, Kanagawa (JP); Yoshinori Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/112,891

(22) Filed: Apr. 1, 2002

(65) Prior Publication Data
US 2002/0154277 A1 Oct. 24, 2002

(30) Foreign Application Priority Data
Apr. 2, 2001 (JP) .................................. 2001-102846

(51) Int. Cl.[7] .............................................. G03B 21/14
(52) U.S. Cl. ........................................... 353/31; 353/94
(58) Field of Search ............................. 353/31, 33, 34, 353/37, 94, 84, 29; 349/5, 8

(56) References Cited

U.S. PATENT DOCUMENTS 5,580,142 A * 12/1996 Kurematsu et al. ............ 353/31
6,409,349 B1 * 6/2002 O'Connor ..................... 353/91
2002/0186349 A1 * 12/2002 Wichner et al. ............... 353/29

* cited by examiner

Primary Examiner—William Dowling
(74) Attorney, Agent, or Firm—Frommer Lawrence & Haug LLP; William S. Frommer

(57) ABSTRACT

The present invention relates to an image display device that is suitably applicable to, for example, a projector using an ultrahigh-pressure mercury lamp as a light source. In a light source of the present invention, main light is partially replaced with auxiliary light in a wavelength region in which the intensity of the main light is less than that of the auxiliary light. That is, the light source includes an illumination-light combining member that generates illumination light by strengthening the wavelength region of the emission spectrum of the main light with the auxiliary light. Accordingly, the loss of main light is satisfactorily reduced, and the light intensity in the wavelength region in which the intensity of the main light is insufficient is compensated for. Further, light emitted from the main light source formed of a lamp or the like is efficiently utilized, and a bright image can thereby be displayed with high color reproducibility.

11 Claims, 8 Drawing Sheets

IMAGE DISPLAY DEVICE

BACKGROUND OF THE INVENTION

1. Field of the Invention

The present invention relates to an image display device that is applicable to, for example, a projector using an ultrahigh-pressure mercury lamp as a light source. In the image display device of the present invention, substantially white main light emitted from a lamp or the like is partially replaced with auxiliary light emitted from a laser light source or the like. Illumination light is generated by strengthening the emission spectrum of the main light with the auxiliary light so that the light emitted from the light source is efficiently used and so that a bright image is displayed with high color reproducibility.

2. Description of the Related Art

In related projectors serving as image display devices, illumination light emitted from a given light source is separated into red, blue, and green wavelength regions, and is modulated by corresponding spacial light modulators such as liquid crystal panels. Subsequently, light beams emitted from the spacial light modulators are superimposed and projected onto the screen, thereby displaying a color image.

In such a projector, the light source is formed of an ultrahigh-pressure mercury lamp (hereinafter referred to as an "UHP" lamp), that provides a high luminous efficiency in the visible region, for efficient emission of illumination light.

FIG. 11 shows the emission spectrum of the UHP lamp. As shown in this figure, a sufficient light intensity can be ensured in the blue and green wavelength regions around 440 nm and 550 nm. However, the light intensity is insufficient in the red wavelength region above 600 nm. For this reason, in the related projectors, the light intensity in the blue and green wavelength regions is reduced in order to adjust the balance with the light intensity in the red wavelength region and to thereby ensure sufficient color reproducibility.

In such a case in which the light intensity in the blue and green wavelength regions is reduced to ensure balance with the light intensity in the red wavelength region, part of the illumination light emitted from the light source is wasted, and this makes the displayed image dark.

As a method for solving the above problem, the light source may be formed of a xenon lamp that has an emission spectrum with better balance than that of the UHP lamp. However, the luminous efficiency of the xenon lamp is lower than that of the UHP lamp. For this reason, when the xenon lamp is used as the light source in order to ensure a brightness equivalent to that in the UHP lamp, the power consumption is markedly increased.

In contrast, for example, Japanese Unexamined Patent Application Publication No. 2000-131665 discloses a method for generating illumination light using light sources that separately emit light beams in red, blue, and green wavelength regions. In this case, only elements such as semiconductor lasers and light-emitting diodes can be adopted as the separate light sources. However, high-output and highly versatile elements for emitting light in the blue and green wavelength regions are not readily available. Incidentally, high output can be achieved by using a plurality of low-output elements. In this case, however, the etendue of the light source (the product of the area and the radiation solid angle of the light source) increases. Consequently, even when a spacial light modulator having a diagonal size of approximately 1 inch is illuminated by such a light source, the illumination efficiency is saturated, and a bright image display is impossible.

SUMMARY OF THE INVENTION

The present invention has been made in view of the above problems, and an object of the invention is to provide an image display device in which a bright image can be displayed with high color reproducibility by efficiently utilizing illumination light emitted from a lamp or the like.

The present invention is applied to an image display device. In a light source, main light is partially replaced with auxiliary light in a wavelength region in which the intensity of the main light is less than that of the auxiliary light. That is, the image display device includes illumination-light combining means that generates illumination light by strengthening the wavelength region of the emission spectrum of the main light with the auxiliary light. Accordingly, the loss of main light is satisfactorily reduced, and the light intensity in the wavelength region in which the intensity of the main light is insufficient is compensated for. Further, illumination light emitted from the main light source formed of a lamp or the like is efficiently utilized, and a bright image can thereby be displayed with high color reproducibility.

Further objects, features and advantages of the present invention will become apparent from the following description of the preferred embodiments with reference to the attached drawings.

DESCRIPTION OF THE PREFERRED EMBODIMENTS

First Embodiment

Figure 1:
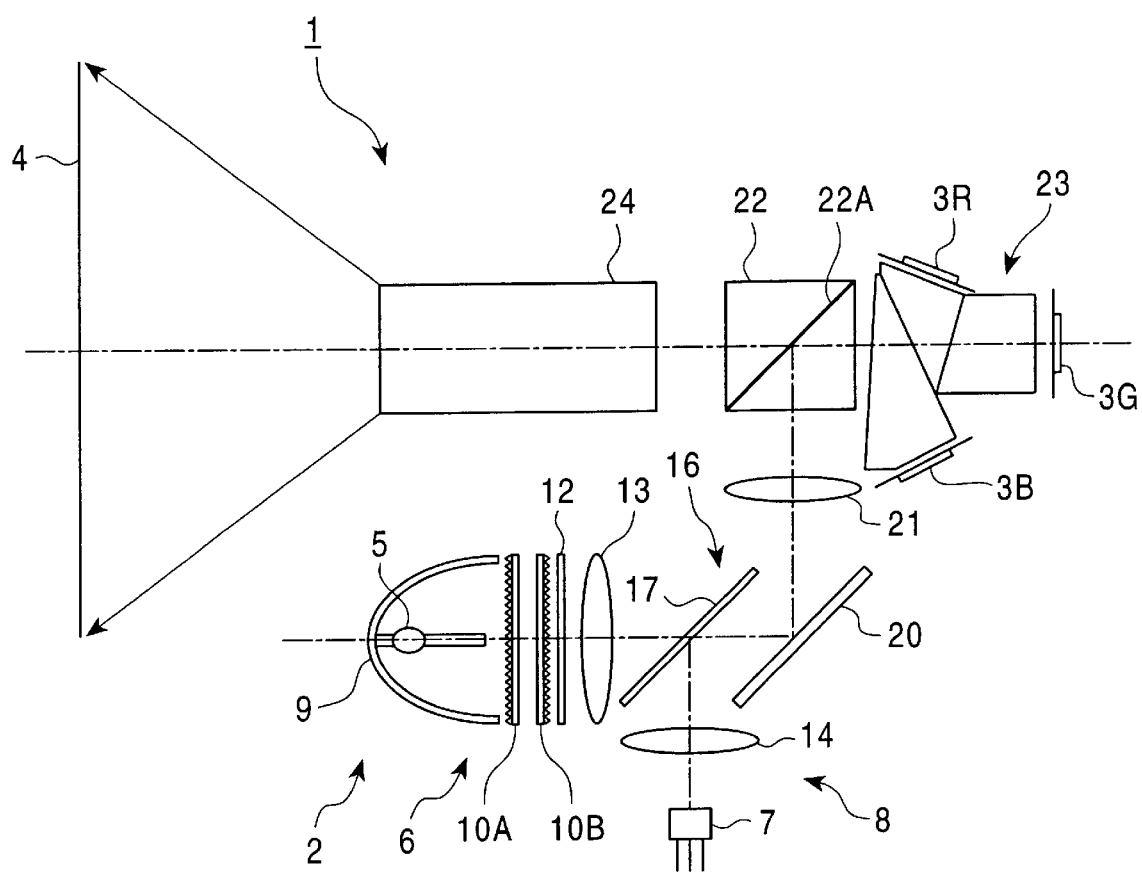
FIG. 1 is an explanatory view of a projector according to a first embodiment of the present invention.

Referring to FIG. 1, a projector 1 modulates illumination light emitted from a light source 2 by reflective liquid crystal display panels 3R, 3G, and 3B serving as spacial light modulators, and displays a desired image on a screen 4.

The light source 2 includes a main light source 6 formed of a UHP lamp 5, and an auxiliary light source 8 formed of a semiconductor laser 7 serving as a laser light source. In the main light source 6, substantially white light emitted from the UHP lamp 5 is directed into flyeye lenses 10A and 10B directly or after being reflected by a reflector 9. The flyeye lenses 10A and 10B transmit this main light from the main light source 6 after making the intensity distribution uniform. A polarizing element 12 disposed next transmits the light from the flyeye lenses 10A and 10B while converting a P-polarized light component of the light into an S-polarized light component. A relay lens 13 converts the light emitted from the polarizing element 12 into substantially parallel light, and emits the light. Accordingly, in the main light source 6, the light distribution is substantially uniform, and the main light from the UHP lamp 5 is emitted in the form of substantially parallel light.

Figure 2:
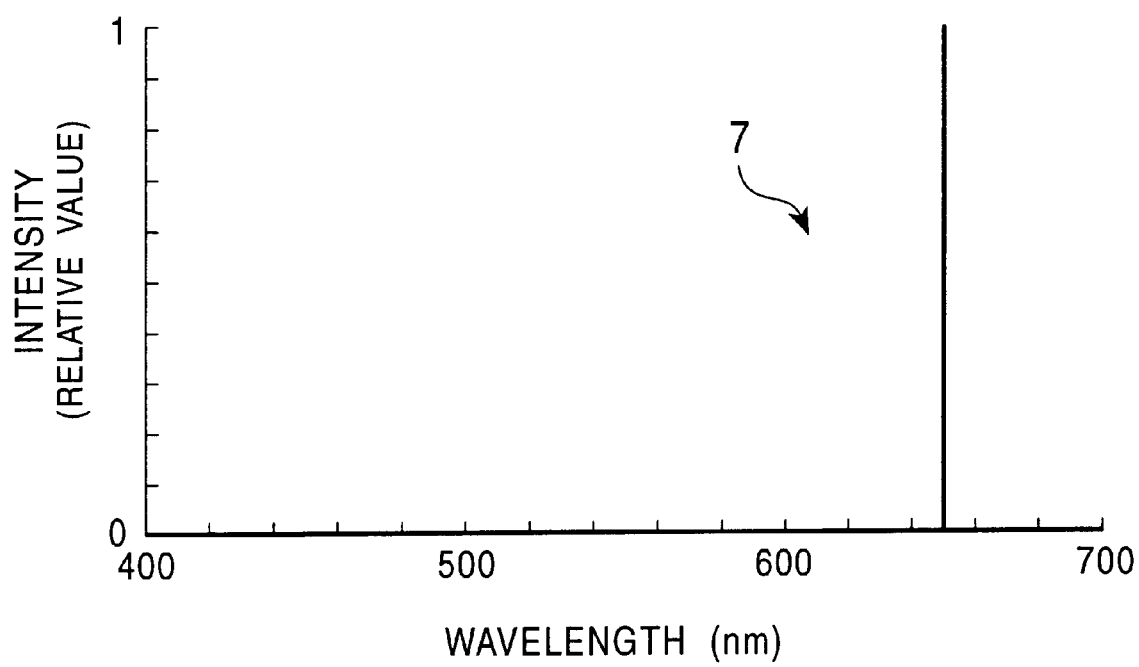
FIG. 2 is a characteristic curve showing the characteristics of a semiconductor laser in the projector of the first embodiment.

In contrast, in the auxiliary light source 8, a laser beam having a wavelength of approximately 650 nm is emitted from the semiconductor laser 7. The laser beam is in the red wavelength region, as shown by the emission spectrum of FIG. 2. The auxiliary light source 8 is placed so that the optical axis of the laser beam is nearly orthogonal to the optical path of the main light. The auxiliary light source 8 corrects the beam shape of the laser beam via a given optical system 14, and also corrects the intensity distribution and the divergence angle. In the auxiliary light source 8, the tilting angle of the semiconductor laser 7, and the like are determined so that the polarization plane of the auxiliary light corresponds to the polarization plane of the main light.

In the light source 2, an illumination-light combining means 16 is placed at the intersection of the optical paths of the main light and the auxiliary light. In a predetermined wavelength region centered on the center wavelength of the auxiliary light, in which the intensity of the main light is less than that of the auxiliary light, the main light is partially replaced with the auxiliary light, and illumination light is thereby generated so that the red wavelength region of the emission spectrum of the main light is strengthened with the auxiliary light.

In the illumination-light combining means 16 of this embodiment, a reflective hologram element 17 is placed at the intersection of the optical paths of the main light and the auxiliary light so that it is at an angle of approximately 45° to the optical paths. The reflective hologram element 17 is a Lippmann-type thick hologram. The reflective hologram element 17 reflects the auxiliary light, and transmits the main light except for the wavelength region corresponding to the auxiliary light, by selecting the diffraction wavelength region. Hence, the main light is partially replaced with the auxiliary light so as to compensate for the insufficient intensity of the main light in the red wavelength region.

Figure 4:
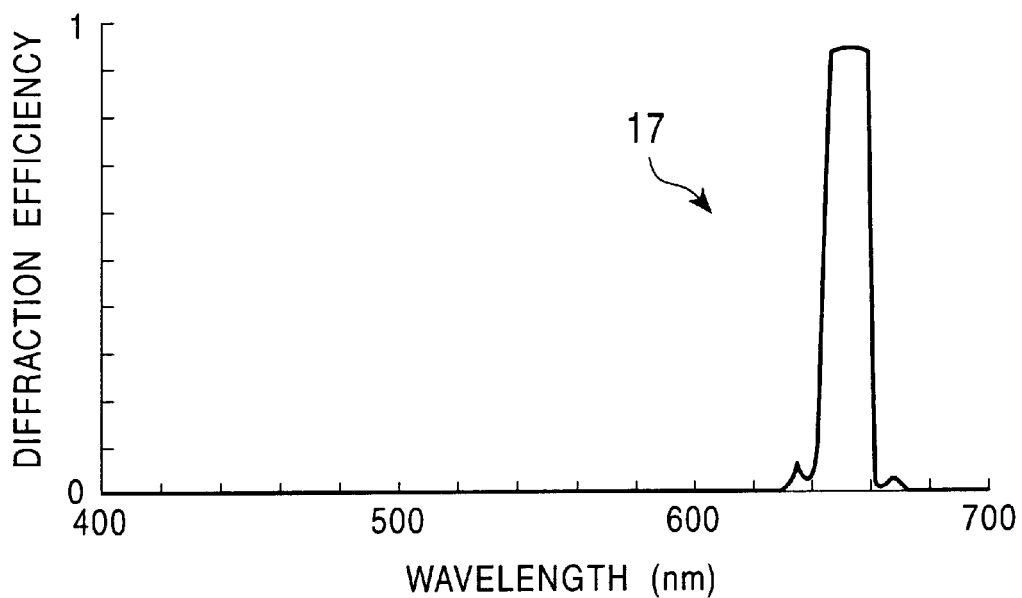
FIG. 4 is a characteristic curve showing the characteristics of the reflective hologram element.

That is, the reflective hologram element 17 is formed by placing a hologram layer 17A (approximately 10 $\mu$m in thickness) between glass substrates 17B and 17C. In the reflective hologram element 17, for example, the index modulation is 0.05, the hologram thickness is 10 $\mu$m, the hologram's average refractive index is 1.52, the incident angle in air is 45°, and the diffraction angle in air is −45° so that the full width at half maximum of the diffraction wavelength region is approximately 15 nm to 20 nm, as shown in FIG. 4.

By changing the hologram exposure wavelength, the center wavelength of the diffraction wavelength region is controlled so that it is nearly equal to the center wavelength (650 nm) of the auxiliary light.

Figure 5:
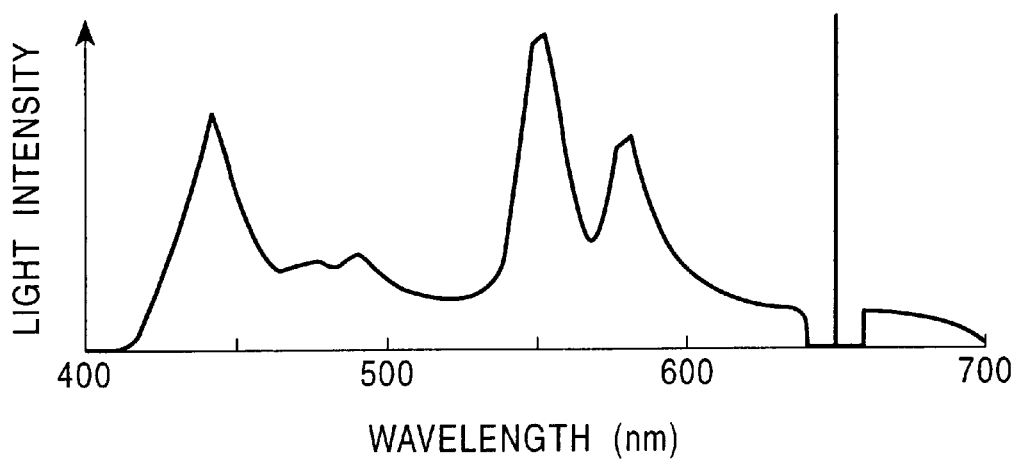
FIG. 5 is a characteristic curve showing the result of combination of illumination light in the projector of the first embodiment.

Thus, the reflective hologram element 17 efficiently transmits the main light except for the wavelength region around 650 nm, and efficiently reflects the auxiliary light in the wavelength region around 650 nm so that the reflected light is combined with the transmitted main light. As a result, the light source 2 can emit a sufficient quantity of illumination light even in the red wavelength region, where the intensity of the light from the UHP lamp is insufficient, as shown in FIG. 5 that is provided for comparison with FIGS. 2 and 11.

A mirror 20 reflects the illumination light thus emitted from the light source 2, and bends the optical path by approximately 90°. A condenser lens 21 directs the illumination light reflected by the mirror 20 into a polarization beam splitter 22 while spreading the illumination light by a predetermined amount.

The polarization beam splitter 22 is formed by bonding two prisms. An analyzing surface 22A at the bonding surface analyzes the illumination light incident from the condenser lens 21, and image light emitted from the reflective liquid crystal display panels 3R, 3G and 3B. That is, the polarization beam splitter 22 selectively reflects an S-polarized light component of the incident illumination light from the condenser lens 21, and directs the component toward a dichroic prism 23 serving as a color combining and separating means. The polarization beam splitter 22 also selectively transmits a P-polarized light component of the image light that traces the reverse optical path of the emergent illumination light, and directs the component toward a projection lens 24.

The dichroic prism 23 sequentially separates light in the blue and red wavelength regions from the illumination light emitted from the polarization beam splitter 22, and supplies the light to the blue and red reflective liquid crystal display panels 3B and 3R, respectively. The light other than in the blue and red wavelength regions, that is, the light in the green wavelength region, is supplied to the green reflective liquid crystal display panel 3G. Conversely, the dichroic prism 23 combines image light emitted from the reflective liquid crystal display panels 3R, 3G, and 3B, and directs the image light toward the polarization beam splitter 22.

The reflective liquid crystal display panels 3B, 3R, and 3G reflect the incident light while rotating the polarization of the incident light according to image signals for the blue, red, and green wavelength regions, thereby spacially modulating the illumination light according to the image signals, and emitting image light as a combination of P-polarized light and S-polarized light. In the projector 1, only the P-polarized light component of the image light that is spacially modulated by the reflective liquid crystal display panels 3B, 3R, and 3G is transmitted through the polarization beam splitter 22.

The projection lens 24 projects the image light transmitted through the polarization beam splitter 22 onto the screen 4.

(1) Operation of First Embodiment

Figure 11:
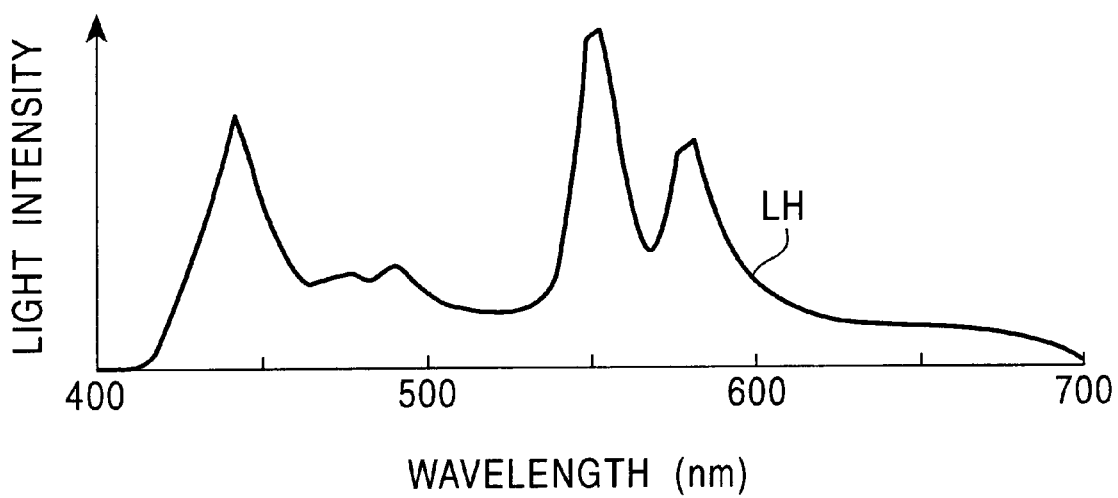
FIG. 11 is a characteristic curve showing the luminous characteristics of an UHP lamp.

In the projector 1 with the above-described configuration (FIG. 1), main light is emitted from the UHP lamp 5 in the main light source 6 (FIG. 11). The intensity distribution of the main light is corrected by the flyeye lenses 10A and 10B, a P-polarized light component thereof is converted into an S-polarized light component by the polarizing element 12, and the main light is supplied to the reflective hologram element 17 serving as the illumination-light combining means 16.

Figure 3:
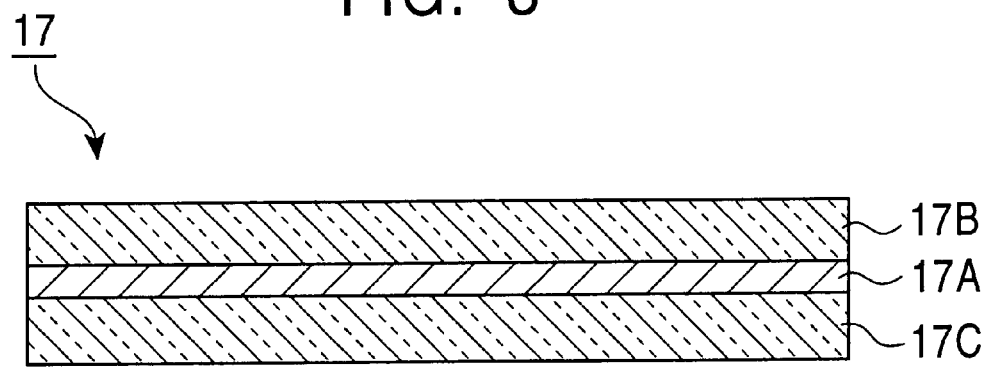
FIG. 3 is a sectional view of a reflective hologram element in the projector of the first embodiment.

In the auxiliary light source 8, auxiliary light in the red wavelength region is emitted from the semiconductor laser 7 (FIG. 2), is subjected to various corrections corresponding to the main light, and is supplied to the reflective hologram 17 (FIG. 3).

The auxiliary light is reflected by the reflective hologram element 17 so that the optical path thereof is bent by approximately 90. In contrast, most of the main light is transmitted through the hologram element 17 except for the region corresponding to the full width at half maximum. The main light is thereby partially replaced with the auxiliary light. As a result, insufficient main light in the red wavelength region is compensated for (FIG. 5).

In this embodiment, such replacement with the auxiliary light is made by the hologram element 17. In the hologram element 17, the main light can be partially replaced with the auxiliary light in a sharp and narrow wavelength region corresponding to the narrow wavelength region of the laser beam emitted from the semiconductor laser 7 and with the loss due to transmission and reflection minimized (FIG. 4).

Accordingly, in the projector 1, sufficient color reproducibility can be achieved by supplementing the main light of insufficient intensity from the UHP lamp 5 in the red wavelength region with the auxiliary light. Further, color reproducibility can be ensured without reducing the light intensity in the blue and green wavelength regions, as before, by increasing the intensity in the red wavelength region so as to adjust the balance of the wavelength regions. Consequently, it is possible to efficiently utilize the illumination light emitted from the lamp light source, and to display a bright image with high color reproducibility.

That is, the illumination light thus generated is reflected by the mirror 20, is guided to the polarization beam splitter 22 via the condenser lens 21, and is reflected toward the dichroic prism 23. The illumination light is separated into blue, red, and green wavelength regions by the dichroic prism 23, is spacially modulated by the corresponding reflective liquid crystal display panels 3B, 3R, and 3G, is combined by the dichroic prism 23, and is directed into the polarization beam splitter 22. Only a P-polarized light component of the illumination light is selectively transmitted through the polarization beam splitter 22, and is projected onto the screen 4 by the projection lens 24. As a result, a bright image is displayed on the screen 4 with high color reproducibility.

(2) Advantages of First Embodiment

In the above configuration, the main light from the UHP lamp is partially replaced with the auxiliary light from the laser light source, and the spectrum of the main light is strengthened with the auxiliary light, thereby generating illumination light. Consequently, it is possible to efficiently utilize the main light from the UHP lamp, and to display a bright image with high color reproducibility.

By using the hologram element as the illumination-light combining means, the main light and the auxiliary light can be efficiently combined, and the loss of the illumination light can be satisfactorily reduced.

Since the hologram element reflects the auxiliary light so as to combine the auxiliary light with the main light, the main light and the auxiliary light can be efficiently combined with a simple structure.

Second Embodiment

Figure 6:
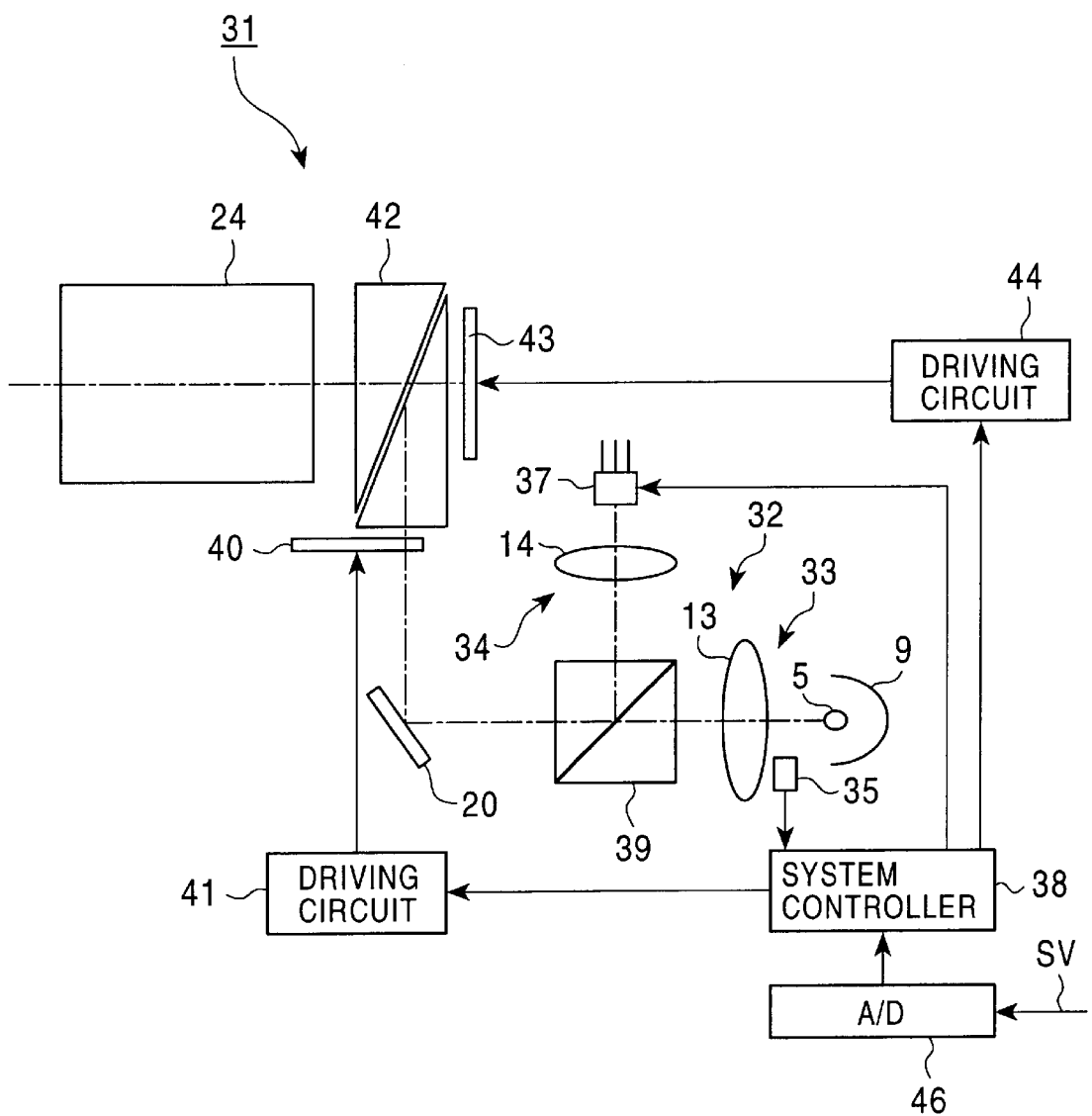
FIG. 6 is a schematic view of a projector according to a second embodiment of the present invention.

In a projector 31 shown in FIG. 6, a light source 32 includes a main light source 33 and an auxiliary light source 34. The main light source 33 has the same structure as that of the main light source 6 in the projector 1 except that the light intensity can be monitored by a photo-detector 35. The photo-detector 35 receives light emitted from the main light source 33 in a green wavelength region in which the human light sensitivity is highest (the center wavelength is 500 nm to 570 nm), and outputs the result of reception. The photo-detector 35 is placed at a predetermined position in the main light source 33 so as not to shade the screen.

Figure 7:
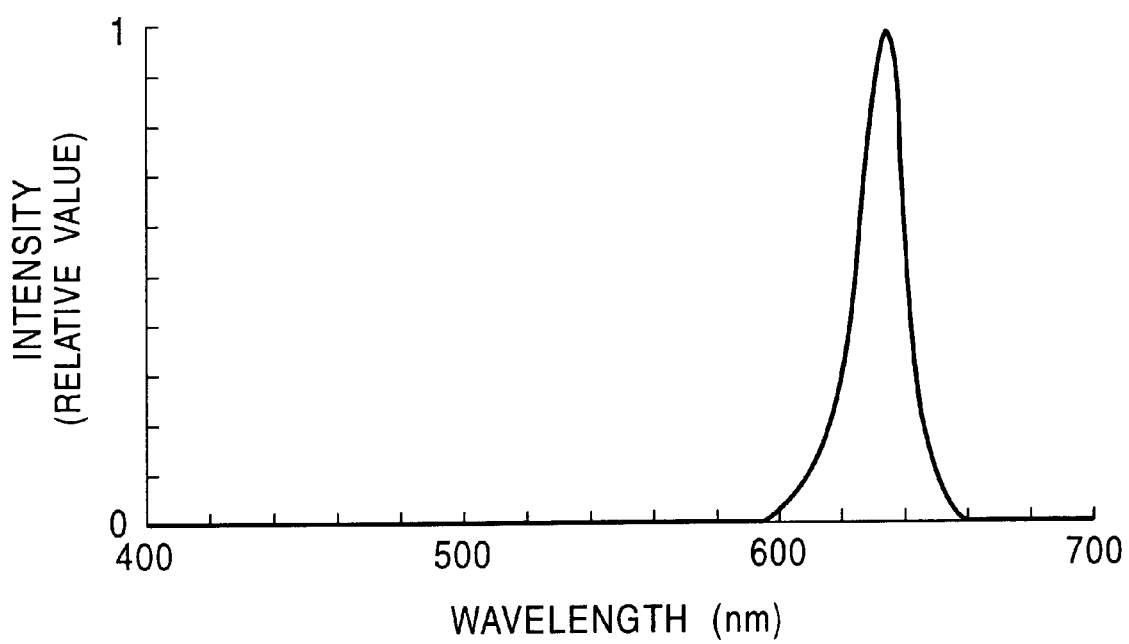
FIG. 7 is a characteristic curve showing the characteristics of a light-emitting diode in the projector of the second embodiment.

In contrast, the auxiliary light source 34 has the same structure as that of the auxiliary light source 8 in the projector 1 except that a light-emitting diode 37 is substituted for the semiconductor laser 7 and that the intensity of the light emitted from the light-emitting diode 37 is controlled by a system controller 38. FIG. 7 shows the emission spectrum of the light-emitting diode 37. As shown in the figure, the light-emitting diode 37 emits illumination light in the red wavelength region where the intensity of the main light is insufficient. The light-emitting diode 37 emits auxiliary light in a narrow wavelength region from 600 nm to 750 nm in which the center wavelength is approximately 635 nm.

In the projector 31, a dichroic prism 39 serves as the illumination-light combining means. The dichroic prism 39 has a dichroic film so as to exhibit the reflection characteristics in the wavelength region corresponding to the light emitted from the light-emitting diode 37. The dichroic prism 39 reflects auxiliary light emitted from the light-emitting diode 37 and directs the light to a mirror 20 in the wavelength region of the auxiliary light, and transmits main light in most of the wavelength regions other than the wavelength region of the auxiliary light and directs the light to the mirror 20. Accordingly, main light from a UHP lamp 5 is partially replaced with auxiliary light from the light-emitting diode, and the spectrum of the main light is strengthened with the auxiliary light, thereby generating illumination light.

A color wheel 40 is a disk-shaped member in which red, green, and blue filters are arranged radially. The color wheel 40 is rotationally driven by a driving circuit 41, and sequentially and cyclically separates illumination light into red, green, and blue wavelength regions. Therefore, the projector 31 can display a color image by a field sequential color method.

A total reflection prism 42 reflects the light transmitted through the color wheel 40, and directs the light to a spacial light modulator 43. The total reflection prism 42 also transmits image light from the spacial light modulator 43, and directs the transmitted light to a projection lens 24.

The spacial light modulator 43 is a DMD (Digital Micromirror Device). The DMD 43 is driven by a driving circuit 44 according to the field sequential color method so as to modulate and reflect the color light beams that are transmitted through the color wheel 40 and are emitted from the total reflection prism 42. Consequently, in the projector 31, red, green, and blue image light spacially modulated by the DMD 43 is projected onto the screen by the projection lens 24, thereby displaying a color image.

An analog-to-digital conversion circuit (A/D) 46 generates a digital video signal by subjecting an analog image signal SV to analog-to-digital conversion, and outputs the digital video signal to the system controller 38. The system controller 38 controls the operation of the driving circuits 41 and 44 by subjecting the digital video signal to distortion correction, gamma correction, or the like. The system controller 38 thereby spacially modulates illumination light according to the image signal, and drives the color wheel 40 in accordance with the spacial modulation.

In order to thus control the driving circuits 41 and 44, the system controller 38 obtains the result of reception by the photo detector 35, and detects the deterioration of the UHP lamp 5 with use on the basis of the reception result. The system controller 38 controls the light intensity emitted from the light-emitting diode 37 according to the detection result. Consequently, in the projector 31, when the characteristics of the UHP lamp 5 change and the emission spectrum of main light also changes, the light intensity emitted from the light-emitting diode 37 is corrected in order to cope with the change and to prevent a change in color reproducibility.

In the above configuration, since the intensity of main light is detected, and the intensity of auxiliary light is controlled on the basis of the detection result, it is possible to prevent the color reproducibility from changing with time.

Since the light intensity is detected using the green wavelength region having the center wavelength ranging from 500 nm to 570 nm, it is possible to correct changes in luminous characteristics in consideration of the human visual performance, and to thereby reliably prevent color reproducibility from changing with time.

Third Embodiment

Figure 8:
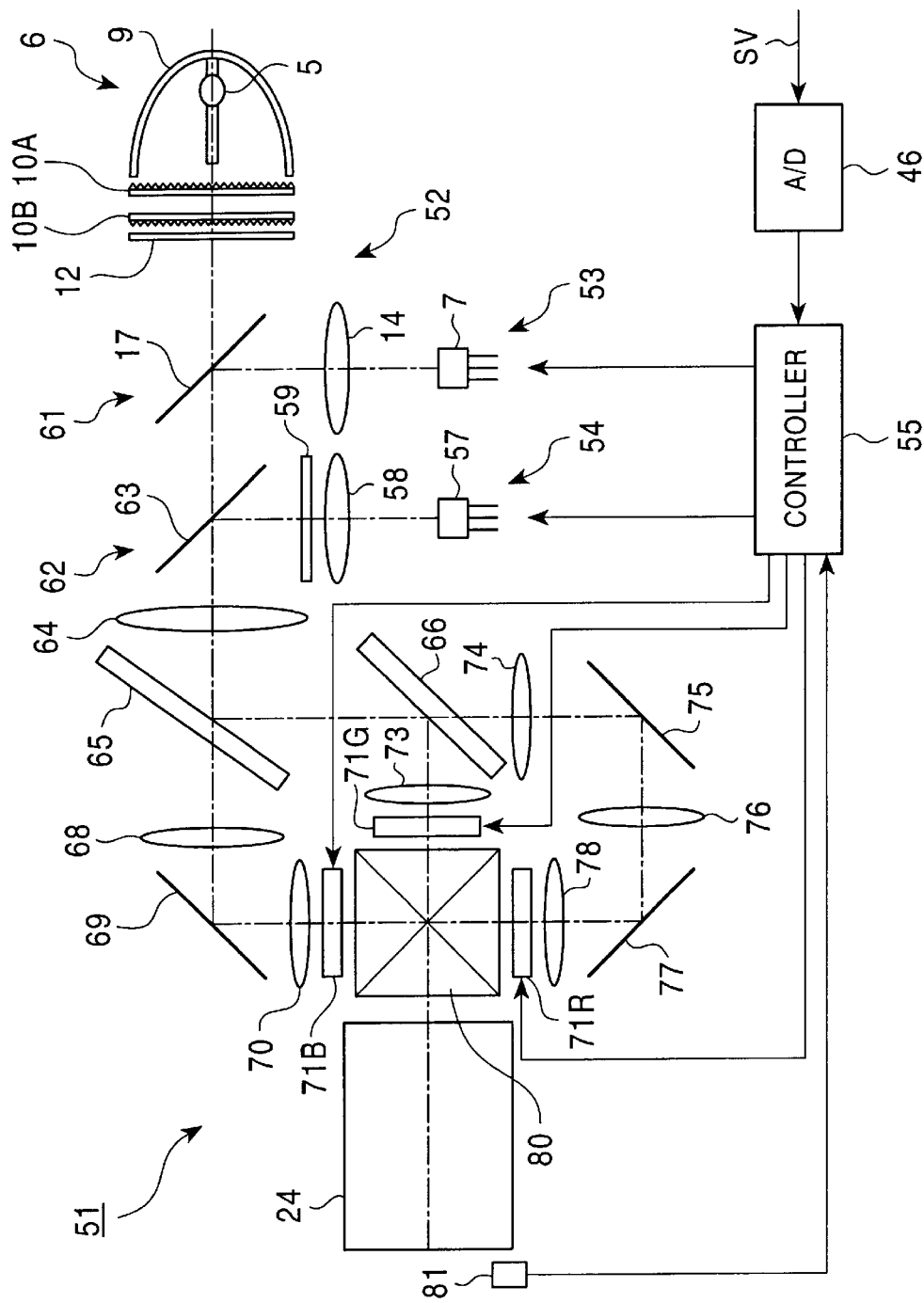
FIG. 8 is a schematic view of a projector according to a third embodiment of the present invention.

In a projector 51 shown in FIG. 8, a light source 52 includes a main light source 6, and first and second auxiliary light sources 53 and 54. The main light source 6 has the same structure as that of the main light source 6 in the projector 1 of the first embodiment except that it emits S-polarized main light.

The first auxiliary light source 53 has the same structure as that of the auxiliary light source 8 in the first embodiment except that the light intensity emitted from a semiconductor laser 7 is controlled by a controller 55, and that the semiconductor laser 7 and the like are placed so as to form a polarizing surface for the main light.

Figure 9:
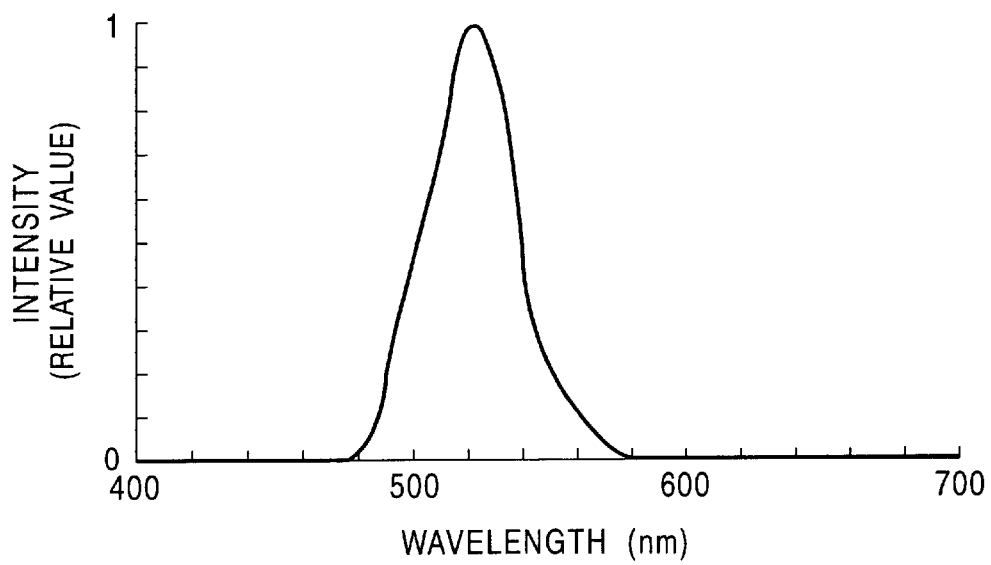
FIG. 9 is a characteristic curve showing the characteristics of a light-emitting diode in the projector of the third embodiment.

The second auxiliary light source 54 comprises a light-emitting diode 57 that emits auxiliary light in the green wavelength region of the light-emitting spectrum shown in FIG. 9 under the control of the controller 55, an optical system 58 for correcting the sectional shape, intensity distribution, divergence angle, and the like of the beams of the auxiliary light, and a polarizer 59 that selectively transmits an S-polarized light component of the auxiliary light emitted from the optical system 58.

The first and second auxiliary light sources 53 and 54 are arranged in order from the side of the main light source 6 so that auxiliary light therefrom intersects the optical path of the main light at approximately right angles. First and second illumination-light combining means 61 and 62 are placed at the intersections of the optical path and the auxiliary light.

The first illumination-light combining means 61 is formed of a reflective hologram element 17 similar to the illumination-light combining means 16 in the first embodiment. Consequently, the spectrum of the main light from a UHP lamp 5 can be efficiently corrected by the auxiliary light emitted from the semiconductor laser 7.

Figure 10:
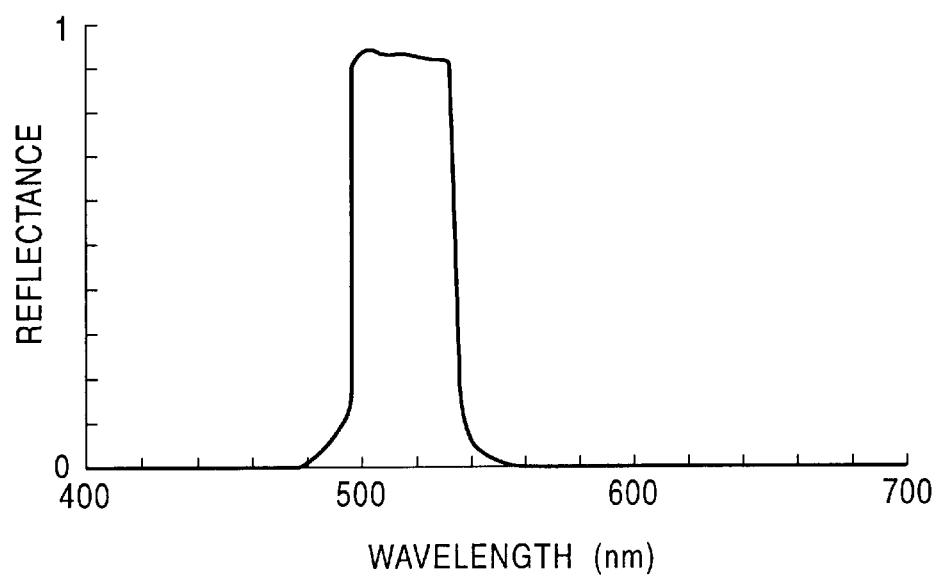
FIG. 10 is a characteristic curve showing the characteristics of a dichroic mirror in the projector of the third embodiment.

The second illumination-light combining means 62 is formed of a dichroic mirror 63 having the characteristics shown in FIG. 10. The dichroic mirror 63 is formed by depositing a dielectric multilayer film on a given glass substrate. In the dichroic mirror 63, part of the auxiliary light in the green wavelength region emitted from the light-emitting diode 57 is limited, and is substituted for the main light emitted from the reflective hologram element 17.

The above allows the light source 52 to compensate for the light intensity not only in the red wavelength region but also in the green wavelength region.

A color separation mirror 65 is a dichroic mirror. The color separation mirror 65 receives the combined illumination light via a condenser lens 64, transmits the illumination light in the blue wavelength region, and reflects the remaining illumination light in the red and green wavelength regions. A color separation mirror 66 having a similar structure is placed on the optical path of the illumination light reflected by the color separation mirror 65 so as to reflect the illumination light in the green wavelength region and to transmit the remaining illumination light in the red wavelength region. Consequently, the projector 51 separates the illumination light emitted from the light source 52 into red, green, and blue illumination light.

A condenser lens 68, a mirror 69, and a condenser lens 70 bend the optical path of the illumination light in the blue wavelength region transmitted through the color separation mirror 65, and direct the illumination light toward a blue spacial light modulator 71B. A condenser lens 73 directs the illumination light in the green wavelength region reflected by the color separation mirror 66 toward a green spacial light modulator 71G. A condenser lens 74, a mirror 75, a condenser lens 76, a mirror 77, and a condenser lens 78 bend the optical path of the illumination light in the red wavelength region transmitted through the color separation mirror 66, and direct the illumination light toward a red spacial light modulator 71R.

The spacial light modulators 71B, 71G, and 71R are formed of a transmissive liquid crystal display panel, and are placed opposed to the faces of a crossed dichroic prism 80 serving as a color-combining prism. The spacial light modulators 71B, 71G, and 71R are driven by a controller 55 according to blue, green, and red image signals, respectively, thereby spacially modulating the illumination light in the wavelength regions and generating image light.

The crossed dichroic prism 80 combines P-polarized light components of the light emitted from the spacial light modulators 71B, 71G, and 71R, and direct the combined light toward a projection lens 24. As a result, a color image is displayed on a screen (not shown) by the projector 51.

A photo-detector 81 receives the light emitted from the projection lens 24 in the green wavelength region (the center wavelength is 500 nm to 570 nm) in which the human light sensitivity is highest, and outputs the result of reception. The photo-detector 81 is placed at a predetermined position so as not to shade the screen.

The controller 55 drives the spacial light modulator 71B, 71G, or 71R corresponding to a digital video signal input from an analog-to-digital conversion circuit 46. The controller 55 drives the spacial light modulators 71B, 71G, and 71R under predetermined conditions for projecting a white display image onto the screen when the power is turned on, and obtains the reception result of the photo-detector 81 while the image is being projected.

Consequently, the controller 55 detects the degree of deterioration of the UHP lamp 5, and controls the intensity of light emitted from the semiconductor laser 7 and the light-emitting diode 57 so as to correct a change in color balance due to the deterioration. Accordingly, in this embodiment, it is possible to more precisely prevent changes in color reproducibility.

Other Embodiments

While the deterioration of the light source is detected and corrected in the green wavelength region in the above embodiments, the present invention is also applicable to, for example, a case in which the deterioration of the light source is detected in various wavelength regions, and a case in which the deterioration of the light source is detected and corrected on the basis of a change in color temperature of the light source.

While the transmissive and reflective liquid crystal panels and the DMDs are used as the spacial light modulators in the above embodiments, the present invention is widely applicable to, for example, a case in which grating light valves (GLV) are used.

While the present invention is applied to a projector in the above embodiments, it is also widely applicable to various image display devices in which a display image is produced by modulating illumination light from the light source.

As described above, according to the present invention, Substantially white main light from the lamp or the like is partially replaced with auxiliary light from the laser light source or the like, and the emission spectrum of the main light is strengthened with the auxiliary light in order to generate illumination light. Therefore, it is possible to efficiently utilize the light emitted from the light source, such as a lamp, and to display a bright image with high color reproducibility.

What is claimed is:

1. An image display device for displaying a desired image by modulating illumination light emitted from a light source by a spatial light modulator, wherein said light source comprises:

a main light source for emitting substantially white main light with a predetermined emission spectrum;

an auxiliary light source for emitting auxiliary light with an emission spectrum different from the emission spectrum of the main light; and illumination-light combining means which replaces the main light with the auxiliary light in a predetermined wavelength region in which the intensity of the main light is less than that of the auxiliary light so as to generate the illumination light with the wavelength region of the emission spectrum of the main light strengthened with the auxiliary light.

2. An image display device according to claim 1, wherein said spatial light modulator is a reflective image display element.

3. An image display device according to claim 1, wherein said main light source is a lamp, and said auxiliary light source is a laser or a light-emitting diode.

4. An image display device according to claim 3, wherein said lamp is an ultrahigh-pressure mercury lamp.

5. An image display device according to claim 1, wherein the center wavelength of the auxiliary light is more than or equal to 600 nm.

6. An image display device according to claim 1, wherein said illumination-light combining means is a dichroic prism or a dichroic mirror having a dielectric multilayer film.

7. An image display device according to claim 1, wherein said illumination-light combining means is a hologram element.

8. An image display device according to claim 1, wherein said illumination-light combining means transmits most of the main light and reflects most of the auxiliary light so as to generate the illumination light.

9. An image display device according to claim 1, further comprising:

intensity detecting means for detecting the intensity of the main light; and control means for controlling the intensity of the auxiliary light on the basis of the result of detection of the intensity by said intensity detecting means.

10. An image display device according to claim 9, wherein said intensity detecting means detects the intensity of the main light in a predetermined wavelength region, and the center wavelength of the predetermined wavelength region is 500 nm to 570 nm.

11. An image display device according to claim 10, wherein the center wavelength of the auxiliary light is 600 nm to 750 nm.

* * * * *